United States Patent
Campbell et al.

(10) Patent No.: US 9,538,744 B1
(45) Date of Patent: Jan. 10, 2017

(54) KINEMATICALLY ACCURATE GAME BIRD DECOY

(71) Applicant: WISYS Technology Foundation, Inc., Madison, WI (US)

(72) Inventors: Timothy John Campbell, Reedsville, WI (US); Ronald O. T. Campbell, Reedsville, WI (US)

(73) Assignee: Wisys Technology Foundation, Inc., Madison, WI (US)

( * ) Notice: Subject to any disclaimer, the term of this patent is extended or adjusted under 35 U.S.C. 154(b) by 0 days.

(21) Appl. No.: 14/804,394

(22) Filed: Jul. 21, 2015

Related U.S. Application Data

(60) Provisional application No. 62/027,407, filed on Jul. 22, 2014.

(51) Int. Cl.
*A01M 31/06* (2006.01)
*A01M 31/00* (2006.01)
*F16M 13/00* (2006.01)
*F16M 11/04* (2006.01)

(52) U.S. Cl.
CPC ............. *A01M 31/06* (2013.01); *A01M 31/00* (2013.01); *F16M 11/043* (2013.01); *F16M 13/005* (2013.01)

(58) Field of Classification Search
CPC .............................. A01M 31/06; A01M 31/00
USPC ......................................................... 43/2, 3
See application file for complete search history.

(56) References Cited

U.S. PATENT DOCUMENTS

| | | | | |
|---|---|---|---|---|
| 3,060,631 A | * | 10/1962 | Collischan | A63H 13/02 446/301 |
| 4,389,811 A | * | 6/1983 | Iwaya | A63H 13/02 446/193 |
| 4,680,022 A | * | 7/1987 | Hoshino | A63H 11/20 180/8.6 |
| 4,896,448 A | | 1/1990 | Jackson | |
| 4,913,676 A | * | 4/1990 | Koguchi | A63H 3/48 446/175 |
| 4,965,953 A | | 10/1990 | McKinney | |
| 5,036,614 A | | 8/1991 | Jackson | |
| 5,182,557 A | * | 1/1993 | Lang | B25J 9/0003 318/568.11 |
| 5,231,780 A | | 8/1993 | Gazalski | |
| 5,233,780 A | | 8/1993 | Overholt | |
| 5,289,654 A | * | 3/1994 | Denny | A01M 31/06 43/2 |
| 5,375,363 A | * | 12/1994 | Higdon | A01M 31/06 43/3 |
| 5,636,466 A | | 6/1997 | Davis | |
| 5,960,577 A | | 10/1999 | Walterson | |
| 6,212,816 B1 | | 4/2001 | Babbitt et al. | |
| 6,339,893 B1 | | 1/2002 | Solomon | |
| 6,658,782 B2 | | 12/2003 | Brint | |
| 6,684,552 B1 | * | 2/2004 | Anders, III | A01M 31/04 43/2 |

(Continued)

FOREIGN PATENT DOCUMENTS

WO WO 03059058 * 7/2003

*Primary Examiner* — Thien Thanh Pham
(74) *Attorney, Agent, or Firm* — Boyle Fredrickson, S.C.

(57) ABSTRACT

A game bird decoy provides for more natural kinematics by providing a smoothly articulating neck, an automatic orientation of the neck with respect to body tipping and improved dual-mode wing activation in which the wings may lift or lift and extend as a function of body angle.

11 Claims, 8 Drawing Sheets

(56) References Cited

U.S. PATENT DOCUMENTS

| | | | |
|---|---|---|---|
| 6,708,440 B2 | 3/2004 | Summers et al. | |
| 6,715,228 B1 | 4/2004 | Price | |
| 7,225,579 B2 | 6/2007 | Haley | |
| 7,568,963 B1 * | 8/2009 | Atsmon | A63H 3/28 |
| | | | 446/175 |
| 7,627,977 B2 | 12/2009 | Denny | |
| 7,739,826 B1 | 6/2010 | Druliner | |
| 8,578,810 B2 * | 11/2013 | Donhowe | A61B 19/2203 |
| | | | 600/141 |
| 8,893,425 B2 | 11/2014 | Tanner et al. | |
| 8,997,394 B2 | 4/2015 | Baskfield et al. | |
| 9,044,006 B1 | 6/2015 | O'Neil | |
| 2003/0182840 A1 | 10/2003 | Colley | |
| 2005/0144828 A1 | 7/2005 | Lewis et al. | |
| 2007/0051030 A1 * | 3/2007 | Haley | A01M 31/06 |
| | | | 43/3 |
| 2011/0088307 A1 | 4/2011 | Rice | |
| 2011/0232154 A1 * | 9/2011 | Crank, Jr. | A01M 31/06 |
| | | | 43/3 |

\* cited by examiner

US 9,538,744 B1

KINEMATICALLY ACCURATE GAME BIRD DECOY

CROSS REFERENCE TO RELATED APPLICATION

This application claims the benefit of U.S. Provisional Application 62/027,407 filed Jul. 22, 2014, and hereby incorporated by reference.

STATEMENT REGARDING FEDERALLY SPONSORED RESEARCH OR DEVELOPMENT

--

BACKGROUND OF THE INVENTION

The present invention relates to hunting decoys and in particular to a game bird decoy that provides more natural movement.

Decoys for bird hunting may include very simple silhouette decoys which provide two-dimensional representations of a bird in silhouette and shell decoys which provide static, three-dimensional representations of a full-bodied bird. The latter shell decoys are preferable to silhouette decoys to the extent that they present a better simulation of a bird from a circling flock overhead.

More advanced decoys also provide for motion. Decoys of this type may rely on wind to move the decoy or decoy parts or battery-powered motors which provide for oscillating or rotating decoy parts. While it is generally appreciated that adding motion to a decoy can improve its realism, poorly implemented motion can have the opposite effect, creating a decoy whose unnatural motion is more frightening than a static decoy and that causes passing flocks to be startled or flare before they approach.

SUMMARY OF THE INVENTION

The present invention provides a moving decoy that better captures the natural motion of a goose or similar game bird in critical aspects, most notably, the characteristic, highly flexible goose neck. The invention further may coordinate neck orientation with posture and wing movement with change in posture. The decoy may be actuated by remote control or by automatic scripts allowing the motion to vary as would occur with the natural goose. In one mode of operation, multiple decoys make intercommunication to provide for flock-like behavior in which activity ripples through multiple decoys in the manner of actual birds responding to one another.

In one embodiment, the invention provides game bird decoy having a body element with a flexible neck element extending therefrom, the body element and flexible neck element sized and decorated to resemble a natural bird. The flexible neck element may include a stack of inter-engaging neck segments extending along a neck axis, each neck segment pivotally attached to an adjacent neck segment to provide a limited pivoting with respect to the adjacent neck segment to curve the neck axis. At least one restoring spring urges the neck segments into resting alignment, and at least one tension band is attached to an upper neck segment to extend downwardly along the neck segments to follow any curvature of the neck axis where it is attached to a servo-motor applying tension to the tension band to controllably curve the flexible neck element. An electronic computer executes a stored program to control the servo-motor to provide for controlled bending of the neck axis.

It is thus a feature of at least one embodiment of the invention to introduce a motion element to otherwise static decoys closer matching the natural movement of the goose or similar game bird.

The game bird decoy may include at least three tension bands attached to at least two servo-motors to provide for forward and left and right controlled curvature of the flexible neck element.

It is thus a feature of at least one embodiment of the invention to permit complex articulation of the neck, for example, simulating feeding or preening by the bird.

The restoring spring may be a central spring element passing upward through the inter-engaging neck segments and wherein the resting alignment is a substantially straight alignment of the inter-engaging neck segments.

It is thus a feature of at least one embodiment of the invention to provide a simple and robust spring-return element of eliminating the assembly of multiple parts or the use of elastomeric materials that may degrade between seasons.

The game bird decoy may include a head element rotatably attached at a distal end of the neck element to rotate about the neck axis as actuated by a servo-motor, and/or the head element may be mounted to the neck element to allow bobbing of the head element with respect to the neck axis about an axis perpendicular to the neck axis as actuated by a servo-motor.

It is thus a feature of at least one embodiment of the invention to provide improved articulation of the head thought to be an important element for simulating lifelike motion.

The head element may further include a hinged jaw element movable between a closed position when the head is upright and an open position when the head is vertically inclined.

It is thus a feature of at least one embodiment of the invention to incorporate lifelike mouth movement into the head.

The neck segments may include plate elements having holes at their peripheries receiving the tension bands to provide ball joints communicating with at least one adjacent neck segment.

It is this a feature of at least one embodiment of the invention to mimic the actual vertebrae of an elongate neck with a simple mechanical element to better simulate natural motion.

The game bird decoy may include a leg stand adapted to support the game bird decoy on a level surface, the leg stand pivotally attached to the body element to allow the body element to tip upward about a horizontal axis with respect to the leg stand as actuated by a body servo-motor.

It is thus a feature of at least one embodiment of the invention to allow for a craning movement found in natural geese and the like.

The neck element may be pivotally attached to the body element and a linkage may communicate between the leg stand and the neck element to change an angle of attachment between the body element and the neck element to provide a substantially constant angle of the neck element with respect to the leg stand as the body element tips upward.

It is thus a feature of at least one embodiment of the invention to mimic the natural stabilization of the head during body motion implemented by living creatures.

The linkage may provide a set of pivoting rigid link elements wherein at least one link element is captured along its length by a collar fixed with respect to the body element for constraining motion of the link element perpendicular to an extent of the link element.

It is thus a feature of at least one embodiment of the invention to provide a simple linkage that may effect a complex positional adjustment normally requiring control of multiple tissue structures.

The game bird decoy may further include at least one wing strut pivotally attached to the body element at a shoulder position proximate to the neck element and extending therefrom and actuable by a wing servo-motor.

It is thus a feature of at least one embodiment of the invention to provide for wing motion normally attendant to balancing the body during movement of the body.

The game bird decoy may include a wing control strut attached to the wing strut and operable by at least two servo-motors to independently operate in a first mode to elevate the wing strut without substantial lateral extension and in a second mode to elevate and laterally extend the wing strut.

It is thus a feature of at least one embodiment of the invention to provide multiple nuanced wing motions to produce a richer vocabulary of animation better matching actual game bird behavior.

The wing control strut may cooperate with the body servo-motor to elevate and laterally extend the wing strut in the second mode when the body is tipped upward.

It is thus a feature of at least one embodiment of the invention to mimic the natural wing adjustment that occurs when the bird is tipping its body upward.

The wing strut may include a humerus section pivotally attached to the body element, an ulna section pivotally attached to the humerus section and a metacarpus section pivotally attached to the ulna section, each threaded with an interconnecting tension cord operating to extend the sections with respect to each other to more closely approximate a single line when the tension cord is pulled, and wherein operation of the body servo-motor to tip the body upward operates to tension the tension cord to straighten the wing strut in addition to elevating and laterally extending the wing strut.

It is thus a feature of at least one embodiment of the invention to provide a more anatomically correct wing motion reflecting the multiple wing bones of the bird.

These particular objects and advantages may apply to only some embodiments falling within the claims and thus do not define the scope of the invention.

DETAILED DESCRIPTION OF THE PREFERRED EMBODIMENT

Figure 1:
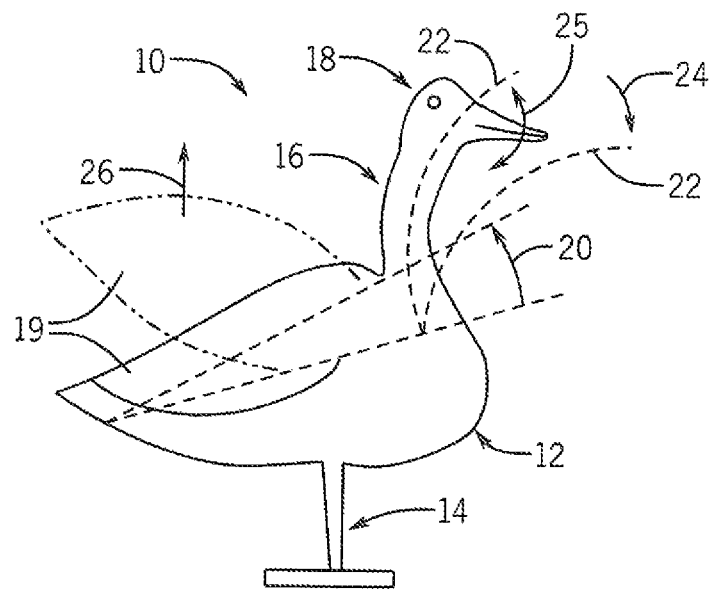
FIG. 1 is a side elevational view of a decoy constructed according to the present invention showing various axes and movements of parts of the decoy.

Referring now to FIG. 1, a kinematically realistic goose decoy 10 may include a body section 12 supported by a leg stand 14 extending downward therefrom. The body section 12 further has a neck section 16 attached at the front of the body section 12 extending generally upward therefrom to a decoy head element 18. Wing elements 19 maybe attached on either side of the body section 12 to move independently of the body section 12. Each of the leg stand 14, body section 12, neck section 16, head element 18 and wing elements are covered with a flexible covering such as a cloth or foam material and are sized, positioned and decorated to look like corresponding elements of an actual goose.

As will be discussed in greater detail below, the goose decoy 10 may provide for a range of different servo-motor controlled motions. As will be understood in the art, servo-motors provide for position control of an actuation lever attached to the motor, the position control obtained through the use of an internal or external feedback loop comprising a position sensor such as a potentiometer and a DC permanent magnet gearmotor or the like.

In a first motion, the body section 12 may tip upward with respect to the leg stand 14 as indicated by arrow 20. Additional motions allow curvature of a neck axis 22 of the neck section 16 to bend forward as indicated by arrow 24 in the manner of goose neck providing a generally curved continuous bending as will be discussed below. The wing elements 19 may elevate vertically as indicated by arrow 26. The head element 18 may nod along a vertical axis with respect to the neck section 16 as indicated by arrow 25.

Figure 2:
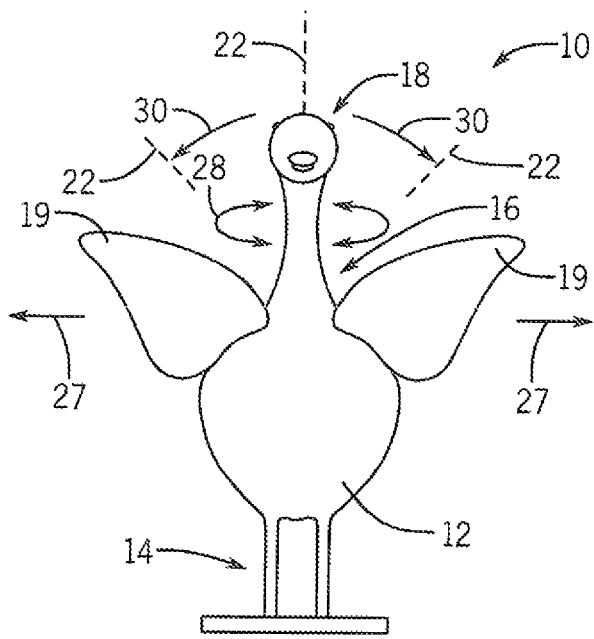
FIG. 2 is a front elevational view of the decoy of FIG. 1 showing additional motions of the decoy.

Referring now to FIG. 2, wing elements 19 may also extend laterally as indicated by arrows 27. The head element 18 may pivot about the neck axis 22 as indicated by arrows 28, and the neck axis 22 of the neck section 16 may curve left or right also providing for a smooth continuous curving in that motion as indicated by arrows 30.

Figure 3:
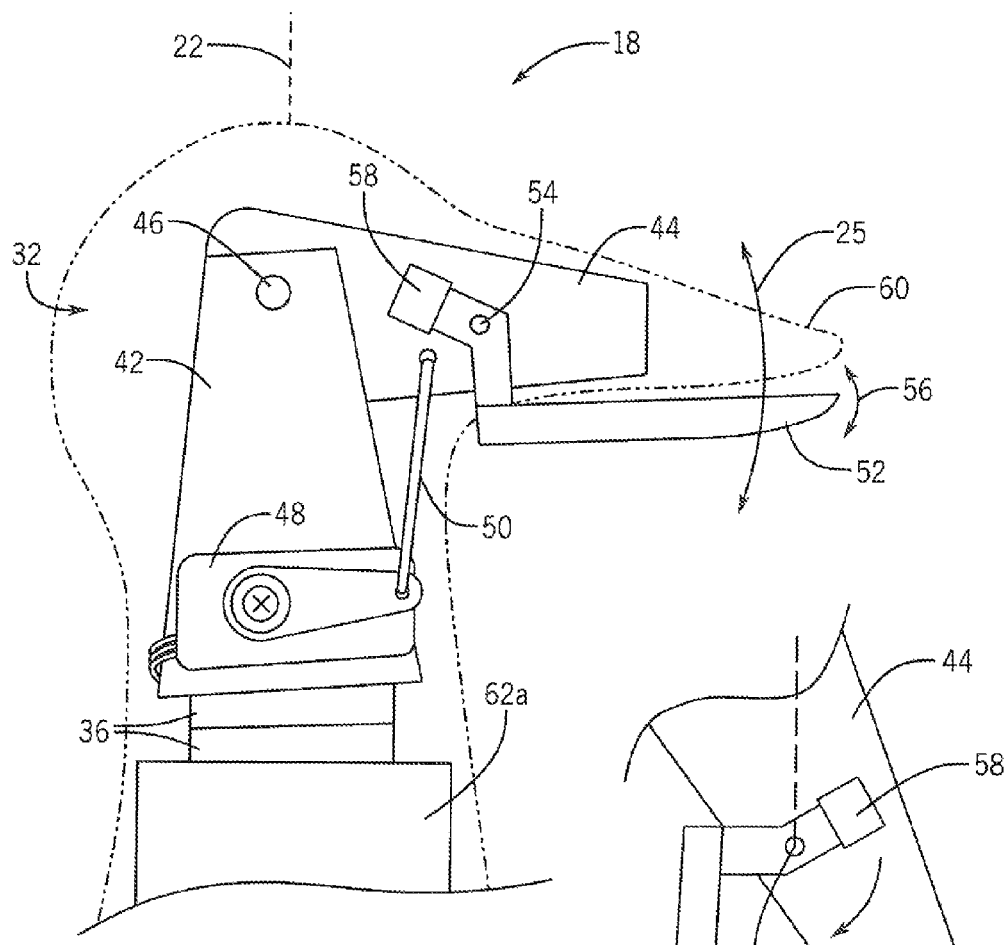
FIG. 3 is a side elevational view of the decoy head with the decoy covering in phantom and showing a gravity-hinged lower bill jaw, and a nodding servo.

Referring now to FIG. 3, the head element 18 may provide for an internal armature 32 attached to an upper vertebral segment 62 of the neck section 16 by means of a swivel joint 36 allowing the armature 32 to rotate as shown by arrows 28 about the neck axis 22.

Figure 5:
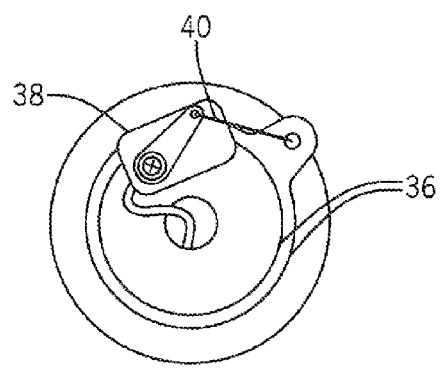
FIG. 5 a top plan view of a neck joint of the decoy head of FIG. 3 showing a servo for rotating the head about the neck axis.

Referring momentarily to FIG. 5, a servo-motor 38 attached to one half of the swivel joint 36 may move a linkage 40 communicating with a structure attached to the other half of the swivel joint 36 so that motion of the servo-motor 38 provides for swiveling of the head armature 32.

Referring again to FIG. 3, head armature 32 may provide for an upstanding yoke 42 that supports a head frame 44 to pivot about a horizontally extending pivot pin 46 to provide the nodding action of arrow 25 shown in FIG. 1. A servo-motor 48 attached to the yoke 42 communicates with the head frame 44 by a linkage 50 to provide a servo-actuated control of the nodding action of arrow 25.

Figure 4:
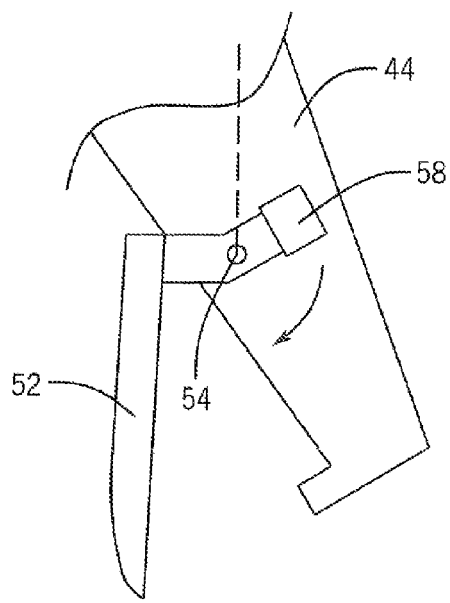
FIG. 4 is a fragmentary view of the gravity-hinged lower bill jaw of FIG. 3 when the head is tipped downward showing opening of the jaw as if during feeding.

Attached to the head frame 44 which extends into the beak area of the head element 18 is a lower beak 52 that may freely pivot about horizontal hinge pin 54 with respect to the head frame 44. A counterweight 58 opposite the hinge pin 54 from the lower beak 52 holds the lower beak 52 into a closed position against an undersurface of the head frame 44. Referring now also to FIG. 4, when the head frame 44 is tipped downward (for example, by articulation of the neck section 16 as will be discussed below) the counterweight 58 passes over the hinge pin 54 causing a clockwise rotation of the lower beak 52 as shown in FIG. 4 opening the lower beak 52 to simulate a goose opening its mouth to feed on an object near the ground.

The lower beak 52 may extend through a flexible covering 60 which otherwise covers the yoke 42, head frame 44, and servo-motors 38 and 48.

Figure 6:
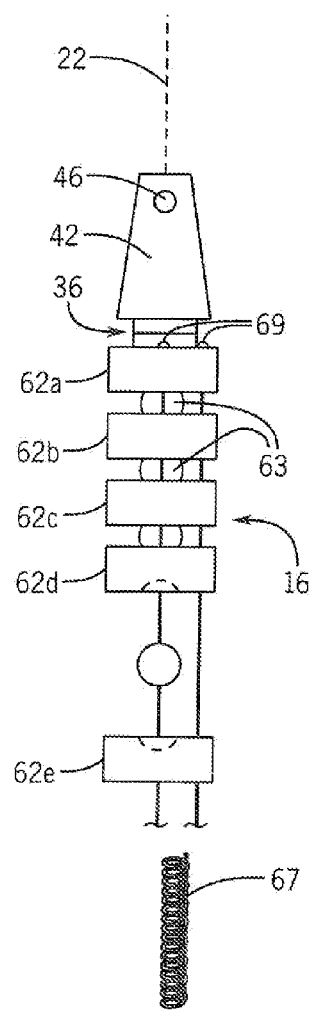
FIG. 6 is a partially exploded side elevational view of the neck element of the decoy of FIG. 1 comprised of multiple stacked neck segments that angle with respect to each other under the control of three tension bands and showing an internal helical spring fitting along the axis of the neck.
Figure 7:
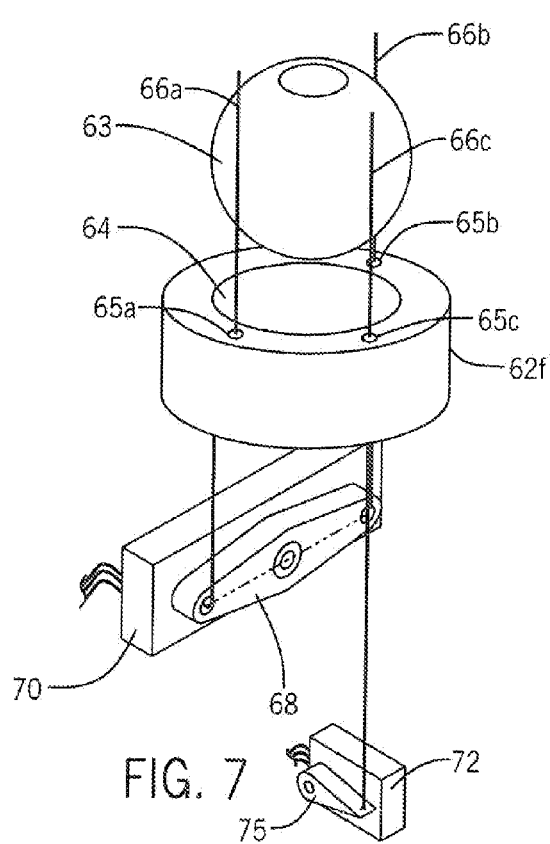
FIG. 7 is an exploded fragmentary view of the lower portion of the neck element of FIG. 6 showing servo control of the tension bands for left, right and forward articulation of the neck.

Referring now to FIGS. 6 and 7, the lower half of the swivel joint 36 may attach to an upper vertebral segment 62a being one of six vertebral segments 62a-f that are stacked to provide the neck section 16. Each vertebral segment 62 provides a generally cylindrical disc having a central bore 64 with opposed concave depressions sized to provide a socket receiving intervening balls 63 between pairs of vertebral segment 62. The ball 63 and the vertebral segment 62 when oriented vertically along a straight vertical neck axis 22 provide a continuous central passage through each of the vertebral segments 62 through which a helical spring 67 may be inserted, the helical spring 67 providing a biasing force on the vertebral segment 62 tending to straighten the stack of vertebral segments 62 and balls 63 along a vertical neck axis 22.

Each of the vertebral segments 62 may further have axially directed holes 65 in peripheral regions of the vertebral segment 62 for receiving tension bands 66 there through. Specifically left and right holes 65a and 65b are diametrically opposed across the bore 64 and may receive left and right vertically extending tension bands 66a and 66b threading successively through each vertebral segment 62. Similarly, a set of axial holes 65 toward the front of the vertebral segments 62 and equally spaced from left and right holes 65a and 65b receive a front tension band 66c. The tension bands 66 pass freely through the holes 65 of all but the uppermost vertebral segment 62a where they are anchored at anchor points 69 on the upper face of the vertebral segment 62a.

The lower ends of the left and right tension bands 66a and 66b are received by opposite ends of a servo-motor lever 68 actuated at its center by servo-motor 70. It will be appreciated that motion of the lever 68 in respective clockwise and counterclockwise directions (as dictated) will cause a smoothly curved articulation of the stack of vertebral segments 62, right and left, in the manner of a gooseneck. In this motion, the angulation of each vertebral segment 62 with respect to its neighbors is substantially equal as moderated by the restoring force of the internal spring 67, the angulation of the vertebral segments 62 operating to reduce the energy of the deformation of that spring 67.

A separate servo-motor 72 positioned near servo-motor 70 provides a lever 75 connected to the lower end of front tension band 66c to provide a forward bending of the neck section 16 downward, for example, as if the goose were feeding, when lever 75 is moved downward. This motion of the neck section 16 may activate the lower beak 52 shown in FIG. 3.

Figure 10:
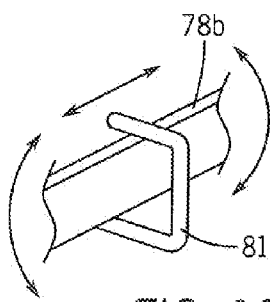
FIG. 10 is a detailed fragmentary view of a floating pivot point used in the linkage of FIGS. 8 and 9.
Figure 8:
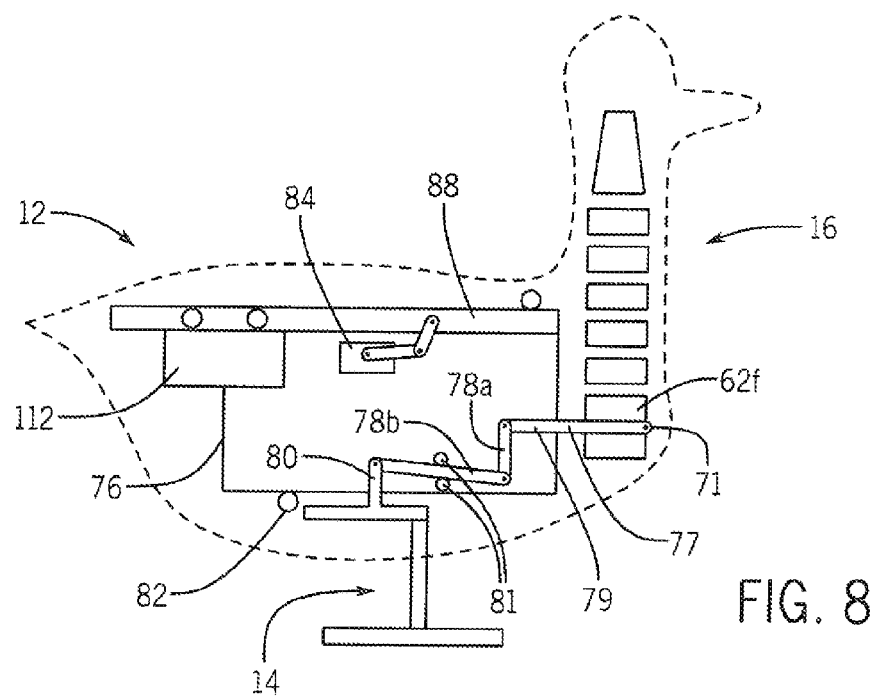
FIG. 8 is a simplified diagram of a linkage communicating between a leg stand and the neck element as supported on the body with the body in a horizontal position.
Figure 9:
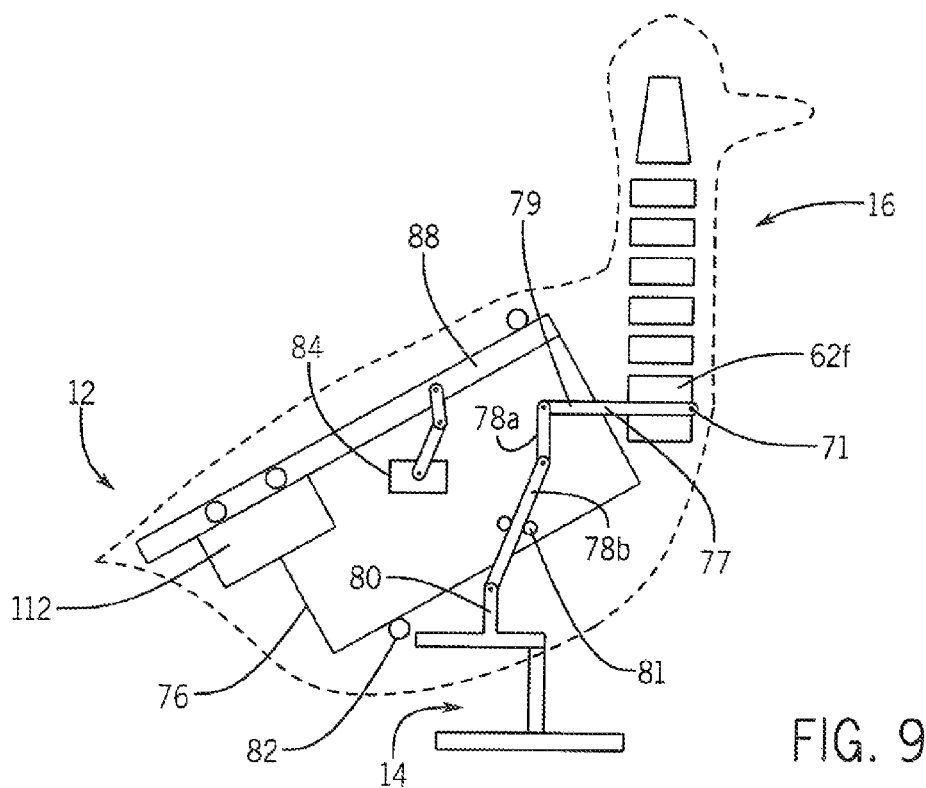
FIG. 9 is a figure similar to that of FIG. 8 showing the body canted upward to elevate the neck with the linkage serving to retain the orientation of the neck elements with respect to the horizon.

Referring now to FIGS. 8 and 9, the lower vertebral segment 62f may be attached to a movable platform 71 also holding the servo-motors 70 and 75 and attached to an internal frame structure 76 of the body section 12 by horizontal pivot pin 77. A lever 79 may extend rearwardly from the movable platform 71 past the pivot pin 77 to be connected by linkage elements 78a and 78b in the internal frame structure 76. Linkage elements 78a and 78b connect the lever 79 to anchor pivot 80 fixed with respect to the leg stand 14. The linkage elements 78a and 78b are pivotally attached to each other and to the respective lever 79 and anchor pivot 80. A central portion of the linkage element 78b is restrained by a loosely fitting collar 81 fixed relative to the frame structure 76. As shown in FIG. 10, the collar 81 allows sliding of the linkage element 78b through the collar 81 as well as a rocking or pivoting about the collar 81 but largely resists motion of the linkage element 78b perpendicular to its length.

The leg stand 14 may be attached by hinge element 82 to the frame structure 76 so that, as shown in FIG. 9, the frame structure 76 may tip upward about a horizontal axis as if the goose were changing its body posture. With this upward tipping, the pivot pin 77 rises as well as the platform 71 lifting the neck section 16. At the same time, operation of the linkage elements 78 serve to rotate the platform 71 clockwise slightly in compensating motion to preserve its level aspect with respect to the ground on which the leg stand 14 rests. In this way the orientation of the neck section 16 is isolated from changes in orientation of the body section 12 in the manner of an actual goose.

Tipping of the frame structure 76 upward with respect to the leg stand 14 may be accomplished by a servo-motor 84 communicating with a backbone strut 88 forming part of the frame structure 76, the servo-motor 84 fixed to a structure stationary with respect the leg stand 14. In this way the tipping of the body section 12 may be flexibly controlled to actuation of the servo-motor 84.

Figure 11:
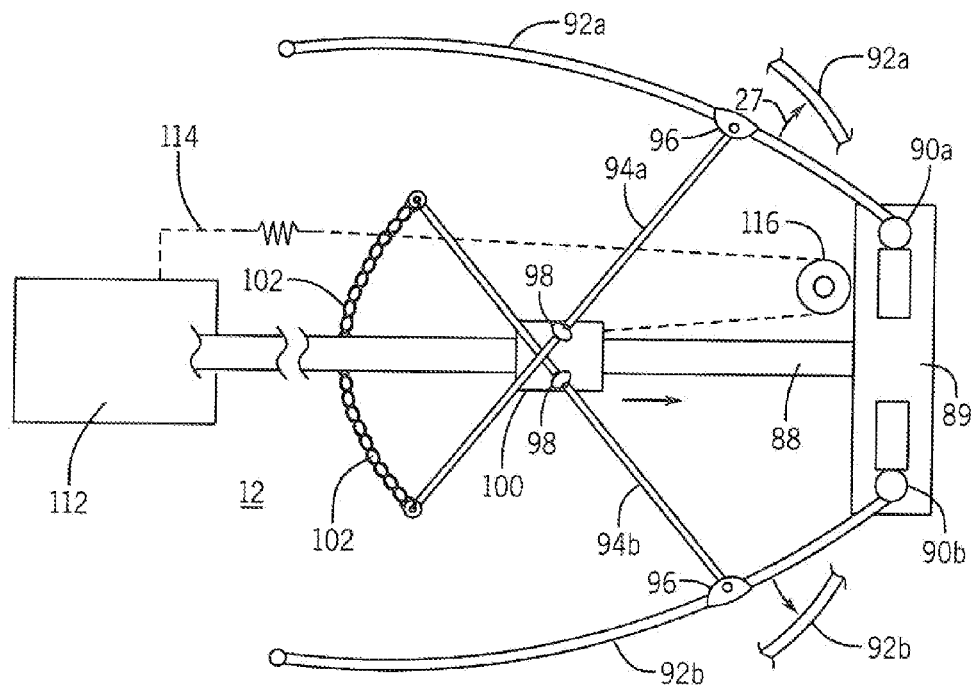
FIG. 11 is a top plan view of the wing strut assembly attached to the body element of FIG. 8 by means of multi-axis ball joints and controlled by control struts extending between the wing struts and a slider pivot whose movement operates to laterally extend the wing struts, the ends of the control struts removed from the wing struts and communicating with a pull chain for elevating the wing struts.
Figure 12:
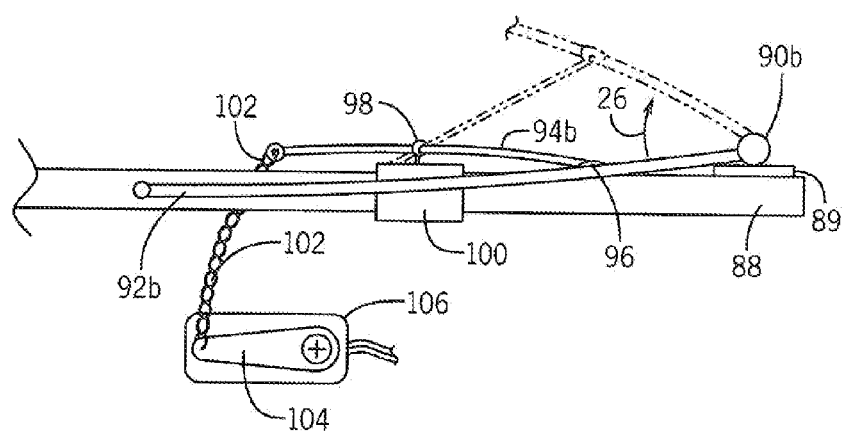
FIG. 12 is a side view of the wing strut assembly of FIG. 11 showing the attachment of a servo-motor to the pull chain to elevate the wing struts.

Referring now to FIGS. 11 and 12, the back backbone strut 88 may support at its front edge a shoulder platform 89 at approximately a location where a bird's wings would connect to the body. The shoulder platform 89 provides two outwardly facing (left and right) ball joints 90*a* and 90*b* attached in turn to wing struts 92*a* and 92*b* shown passing rearward along the body section 12 and providing an internal support structure for decoy wing elements 19 (shown in FIGS. 1 and 2).

Control struts 94*a* and 94*b* are attached at one end via pivot joints 96 to respective wing struts 92*a* and 92*b* at a position removed from the ball joints 90 and slightly rearward therefrom. A midsection of each control strut 94 is supported by respective pivot joints 98 on a slider 100, the latter of which may slide along the backbone strut 88 as will be discussed below. The pivot joints 98 allow multidimensional pivoting of the respective control struts 94 without sliding of the control struts 94 therethrough.

The control struts 94, after being received by the pivot joint 98, extend rearward therefrom crossing over the slider 100 and the backbone strut 88 to terminate at cantilevered points connected to a chain 102 that passes downward on either side of the backbone strut 88 to be received by a lever 104 of servo-motor 106.

It will be appreciated that activation of the servo-motor 106 moves lever 104 in a counterclockwise direction pulling down on the chain 102 and the attached ends of the control struts 94 to raise the attached wing strut 92 providing a vertical elevation of the wing without wing extension as indicated by arrow 26 in FIG. 12. In contrast, movement of the slider 100 forward serves to simultaneously extend the wing struts 92 outward as indicated by arrows 27 caused by movement of the pivot joint 98 forward and to elevate the wings per arrow 26 caused by increased tension in the chain 102, without needed movement of the servo-motor 106. In this way, two different types of wing motion can be obtained.

Referring also to FIGS. 8 and 9, movement of the slider 100 may occur automatically upon tilting upward of the body section 12, for example, as shown between FIGS. 8 and 9, such as causes a slide weight 112 slidably mounted to the backbone strut 88 to slide rearward. A cable 114 passes forward from the slide weight 112 through a front mounted pulley 116 near the platform 89 and then backwards to connect with the slider 100 so that rearward motion of the slide weight 112 serves to pull the slider 100 forward. In this way, elevation of the body section 12 as shown in FIG. 9 causes an extension of the wings simulating a balancing that might be performed by a natural bird when craning its neck.

The slide weight 112, in one embodiment, may hold lithium ion batteries used for powering of the servo-motor system ascribed herein.

Figure 13:
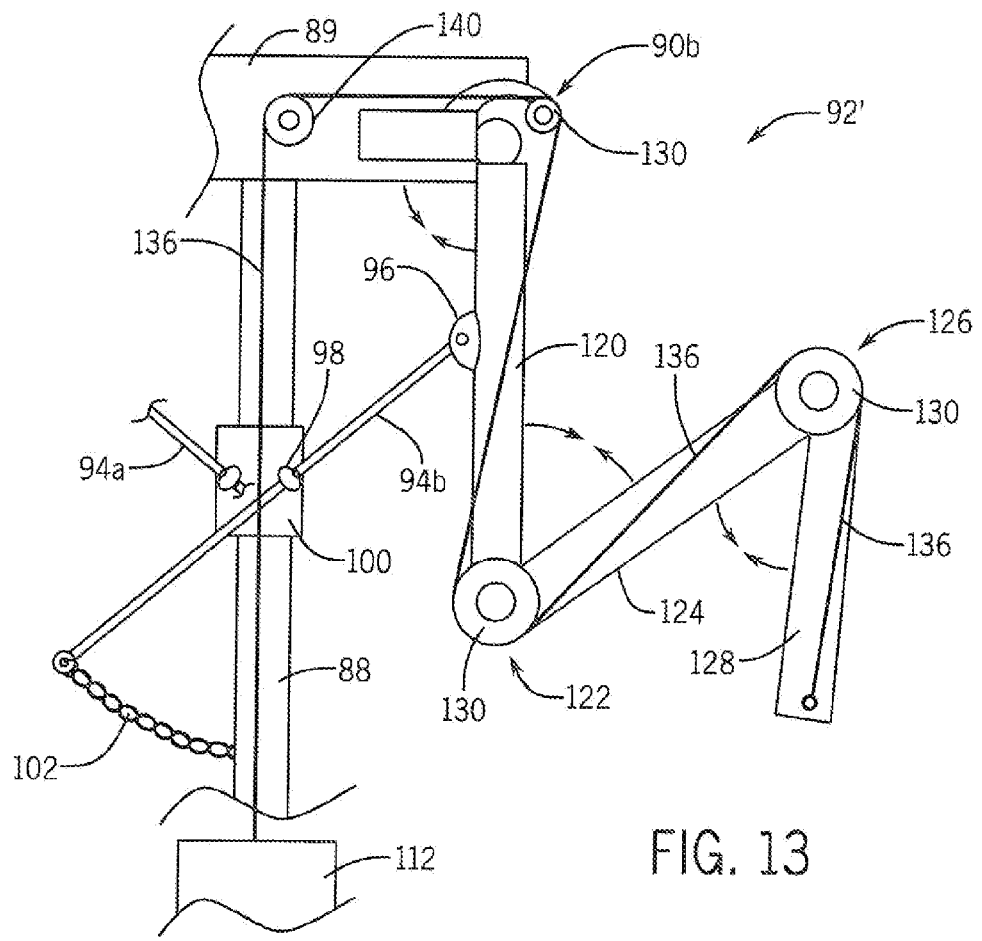
FIG. 13 is a top plan view of an alternative articulated wing strut design providing an additional extension of the wing under the control of a tension cord.

Referring now to FIG. 13, in an alternative embodiment, the wing strut 92' may comprise multiple hingedly-connected segments including an ulna section 120 attached between ball joint 90*b* and a first pivot joint 122 communicating with a humerus section 124. The humerus section 124 may in turn, communicate through pivot joint 126 to a metacarpus section 128. The sections 120, 124, and 128 correspond generally to the same bones found in a bird's wing and have similar proportions.

Figure 14:
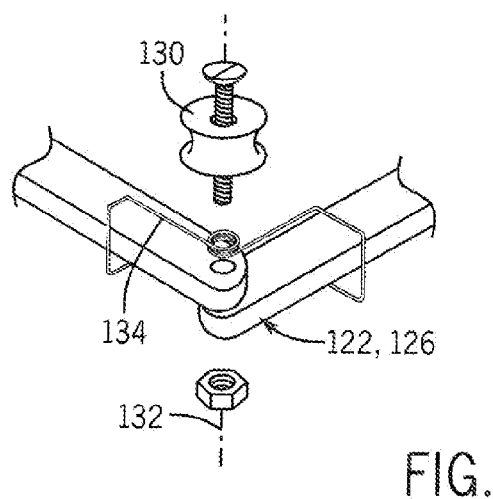
FIG. 14 is an exploded perspective view of one joint of the articulated wing strut of FIG. 13.

Referring to FIG. 14, each joint 122 and 126 may include a tension band guide 130, for example, providing a pulley wheel coaxial with the joint axis 132 and a torsion spring 134 for biasing the joint in a particular direction. A similar arrangement may be applied to ball joint 90*b* with the springs 134 operating so as to generally fold ulna section 120 rearward the against the body section 12 and fold the humerus section 124 forward and the metacarpus section 128 backward in a compact arrangement. A tension band 136 may be anchored to a distal end of the metacarpus section 128 and may pass around and outside of each of the tension band guides 130 associated with the joints 126, 122 and 90*b* to be received by a pulley 142 at which it may curve along the backbone strut 88 to attach to the slide weight 112. It will be appreciated that tension on the tension band 136 will thus serve to elongate the wing to generally pull each of the ulna section 120, humerus section 124, and metacarpus section 128 into a mutually straightened alignment laterally extending from the body. In this way the wings may extend more naturally when the bird body section 12 tips upward as shown in FIG. 9.

Figure 15:
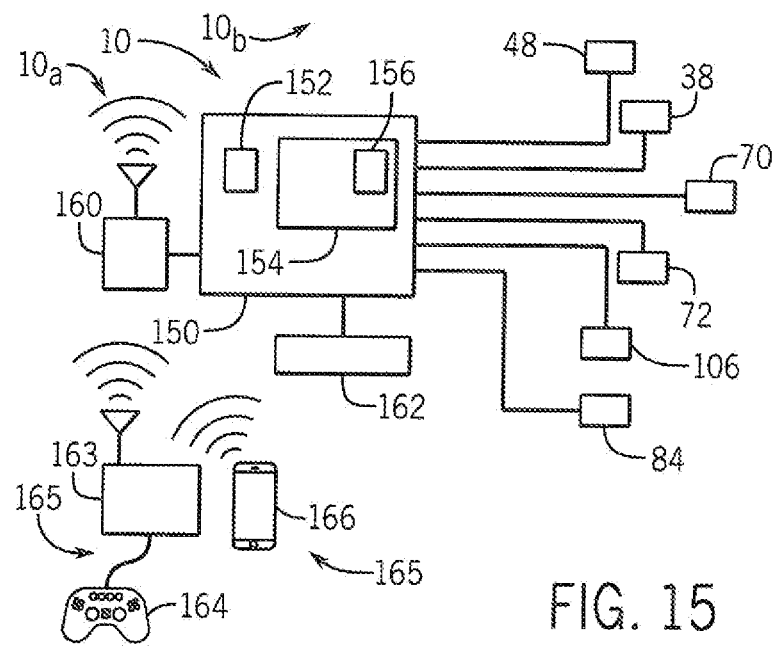
FIG. 15 is an electrical block diagram of the elements of the decoy such as may communicate wirelessly with other decoys and a remote controller or cell phone.

Referring now to FIG. 15, each of the servo-motors 38, 48, 70, 72, 84, and 106 may be controlled by a microcontroller 150 having a processor 152 communicating with a memory 154 holding a stored program 156 as will be described below. The microcontroller 150 may communicate with a radio transceiver 160 that may communicate with a corresponding remote control unit 165 of the type used with remote-controlled aircraft having a transmitter 163 associated with a remote control keypad 164 or with a smart phone 166 or similar device and with the transceivers 160 of other goose decoys 10. The body section 12 may contain lithium ion batteries 162 to provide power for each of the components.

Program 156 may provide for the decoding of signals from the remote control unit 165 allowing continuous control of each of the servos for highly accurate and precise manipulation of the elements described above. In addition or alternatively the program 156 may hold motion scripts that may be invoked to produce various sequences of motion automatically according to a time schedule and list of motions stored in memory 154.

Figure 17:
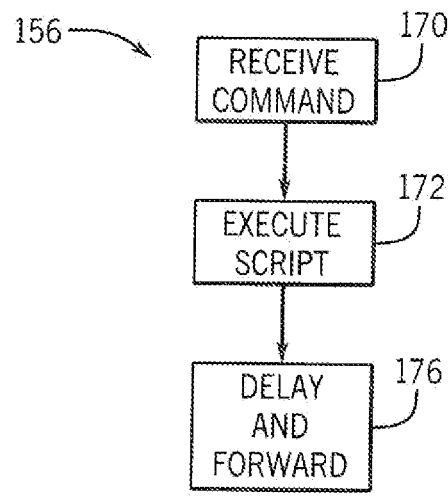
FIG. 17 is a flowchart of a program executing on a computer of FIG. 15.
Figure 16:
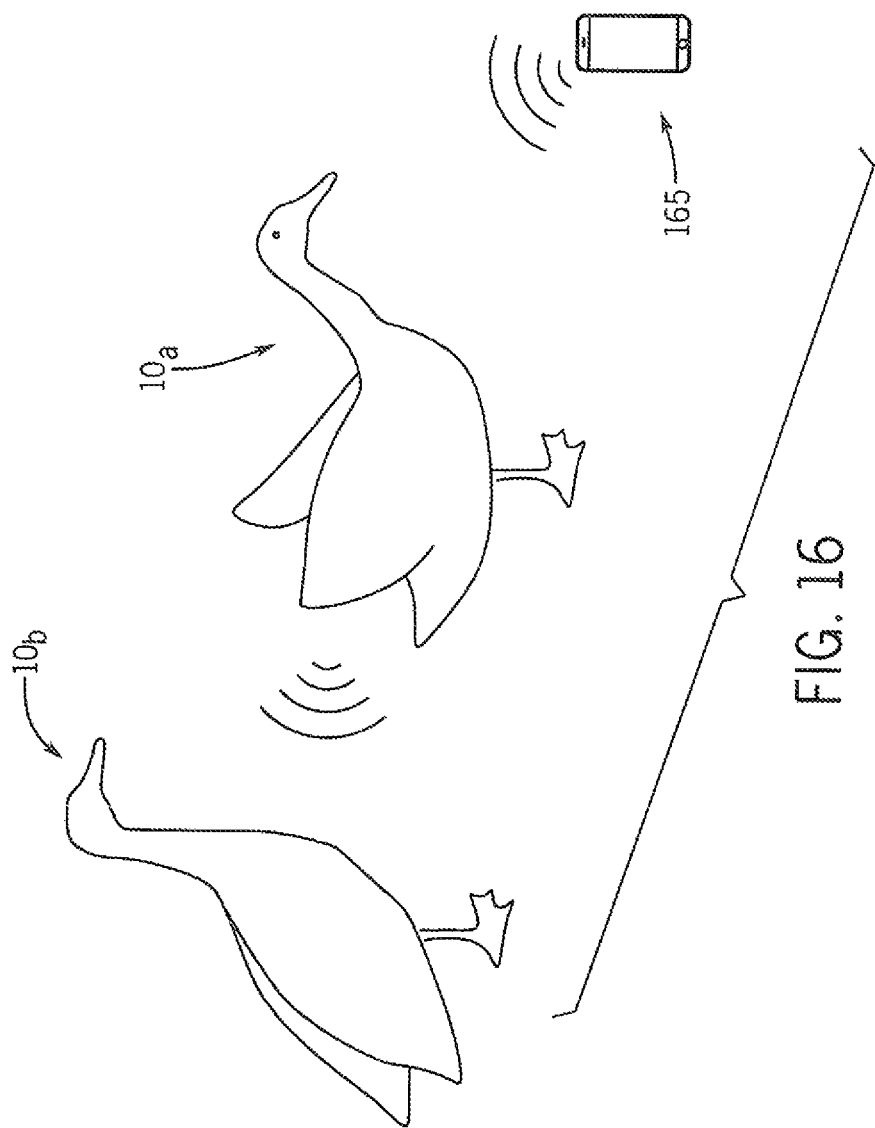
FIG. 16 is a simplified diagram of two decoys according to the present invention having different functionalities and operating to imitate flock behavior through successive yet possibly unique motions.

Referring now to FIGS. 16 and 17, in one embodiment, multiple goose decoys 10*a* and 10*b* (only two shown for clarity) may be deployed together to automatically produce a flock-like motion in which stimulation reflected in motion by one goose decoy 10*a* ripples through the remainder of the flock in the manner of actual flock of birds. Thus, for example, goose decoy 10*a* may be triggered to execute a script by the remote control unit 165, for example, to elevate the body section 12 and then the head element 18 and raise the wings elements 119. This command is indicated by process block 170. After the script is executed as indicated by process block 172, a delay may be imposed and a command sent from goose decoy 10*a* to a next goose decoy 10*b* per process block 176 (for example, according to address order or programmed order) so that goose decoy 10*b* executes the same script or an analog of that script providing a mimicking behavior.

In this regard, it is contemplated that some goose decoys 10 will have limited functionality and accordingly will execute a modified script if all mechanisms necessary for the script execution cannot be implemented. For example, some goose decoys 10 may provide for only wing articulation and some decoys may provide for only neck articulation. In this regard each of the goose decoys 10 may be modular to allow additional mechanical structures to be added to the decoys after purchase, for example, to improve their functionality. It will be appreciated that the present invention is not limited to geese but that all or portions of the present invention may be used in constructing decoys for other game birds including but not limited to other geese such as snow, brant, speckle bellied and blue geese as well as ducks including mallard, wood, green and blue wing teal and numerous other duck species and other birds such as cranes and swans.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the Words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A game bird decoy comprising:
   a body element having a flexible neck element extending therefrom, the body element and flexible neck element sized and decorated to resemble a bird;
   wherein the flexible neck element includes a stack of inter-engaging neck segments extending along a neck axis, each of said neck segments pivotally attached to an adjacent neck segment of said stack of neck segments to provide a limited pivoting with respect to the adjacent neck segment to curve the neck axis;
   at least one restoring spring urging the neck segments into a resting alignment, wherein the resting alignment defines the neck axis;
   at least one tension band attached to an of said stack of neck segments upper neck segment and downwardly extending along the stack of neck segments to follow any curvature of the neck axis;
   a servo-motor receiving the tension band to apply tension to the tension band to controllably curve the flexible neck element; and
   an electronic computer executing a stored program to control the servo-motor to provide for controlled bending of the neck axis;
   wherein the at least one tension band further includes at least three tension bands and the servomotor includes at least two servomotors and wherein the at least three tension bands attached to the at least two servo-motors to provide for forward and left and right controlled curvature of the flexible neck element;
   wherein the restoring spring is a central spring element passing upward through the inter-engaging segments and wherein the resting alignment is a substantially straight alignment of the inter-engaging neck segments;
   further including a head element rotatable attached at a distal end of the neck element to rotate about the neck axis as actuated by second servo-motor said second servo-motor is different from the servo-motor after "a second servo-motor";
   wherein the head element is mounted to the neck element to allow bobbing of the head element with respect to the neck axis about an axis perpendicular to the neck axis as actuated by a third servo-motor said third servo-motor is different the servo-motor and the second servo-motor.

2. The game bird decoy of claim 1 wherein the head element further includes a hinged jaw element movable between a closed position when the head is upright and an open position when the head is vertically inclined.

3. The game bird decoy of claim 1 wherein the neck segments include plate elements having holes at their peripheries receiving the at least one tension band and provide ball joints communicating with at least one adjacent neck segment of said stack of neck segments.

4. The game bird decoy of claim 1 further including a leg, stand adapted to support the game bird decoy on a level surface, the leg stand pivotally attached to the body element to allow the body element to tip upward about a horizontal axis with respect to the leg stand as actuated by a body servo-motor.

5. The game bird decoy of claim 4 wherein the neck element is pivotally attached to the body element and further including a linkage communicating between the leg stand and the neck element to change an angle of attachment between the body element and the neck element to provide a substantially constant angle of the neck element with respect to the leg stand as the body element tips upward.

6. The game bird decoy of claim 5 wherein the linkage provides, a set of pivoting rigid link elements wherein at least one link element is captured along its length by a collar fixed with respect to the body element for constraining motion of the link element perpendicular to an extent of the link element.

7. The game bird decoy of claim 1 further including a wireless communication device communicating with the electronic computer for synchronizing operation of the at least one servo-motor of the game bird decoy with motion of a corresponding servo-motor of at least one second game bird decoy of a type also having a wireless communication device and at least one of said corresponding servo-motor, the synchronizing operation synchronizing motion of the game bird decoy and the at least one second game bird decoy to mimic flock behavior between the game bird decoy and the at least one second game bird decoy.

8. The game bird decoy of claim 7 wherein the electronic computer operates to delay corresponding motions of the servo-motors of the game bird decoy and the at least one second game bird decoy to mimic the at least one second game bird decoy reacting to the motion of the game bird decoy.

9. A game bird decoy comprising:
a body element having a flexible neck element extending therefrom, the body element and flexible neck element sized and decorated to resemble a bird;
wherein the flexible neck element includes a stack of inter-engaging neck segments extending along a neck axis, each of said neck segments pivotally attached to an adjacent neck segment of said stack of neck segments to provide a limited pivoting with respect to the adjacent neck segment to curve the neck axis;
at least one restoring spring urging the neck segments into a resting alignment wherein the resting alignment defines the neck axis;
at least one tension band attached to an upper neck segment of said stack of neck segments and downwardly extending along the stack of neck segments to follow curvature of the neck axis;
a servo-motor receiving the tension band to apply tension to the tension band to controllably curve the flexible neck element; and
an electronic computer executing a stored program to control the servo-motor to provide for controlled bending of the neck axis,
wherein the body element further includes at least one wing strut pivotally attached to the body element at a shoulder position proximate to the neck element and extending therefrom and actuable by a wing servo-motor;
further including a wing control strut attached to the wing strut and operable by at least two wing servo-motors to independently operate in a first mode to elevate the wing strut without lateral extension and in a second mode to elevate and laterally extend the wing strut.

10. The game bird decoy of claim 9 further including a leg stand adapted to support the game bird decoy on a level surface, the leg stand pivotally attached to the body element to allow the body element to tip upward about a horizontal axis with respect to the leg stand as actuated by a body servo-motor and wherein the wing control strut cooperates with the body servo-motor to elevate and laterally extend the wing strut when the body is tipped upward.

11. The game bird decoy of claim 10 wherein the wing strut includes a humerus section pivotally attached to the body element, an ulna section pivotally attached to the humerus section and a metacarpus section pivotally attached to the ulna section, each threaded with an interconnecting tension cord operating to extend the sections with respect to each other to more closely approximate a single line when the tension cord is pulled and wherein operation of the body servo-motor to tip the body upward operates to tension the tension cord to straighten the wing strut in addition to elevating and laterally extending the wing strut.

* * * * *